United States Patent [19]

Morimoto

[11] Patent Number: 4,723,119
[45] Date of Patent: Feb. 2, 1988

[54] LARGE-SIZED COLOR DISPLAY DEVICE
[75] Inventor: Kiyoshi Morimoto, Mobara, Japan
[73] Assignee: Futaba Denshi Kogyo Kabushiki Kaisha, Chiba, Japan
[21] Appl. No.: 730,053
[22] Filed: May 3, 1985
[30] Foreign Application Priority Data May 7, 1984 [JP] Japan .................................. 59-90456
Jan. 23, 1985 [JP] Japan .................................. 60-10588

[51] Int. Cl.⁴ .............................................. G09G 1/00
[52] U.S. Cl. .................................... 340/702; 340/766;
340/815.1; 358/59; 358/65
[58] Field of Search ............... 340/701, 702, 703, 752,
340/760, 766, 770, 780, 781, 815.1, 815.2,
815.31; 40/542, 577, 583; 358/59, 60, 64, 65,
242

[56] References Cited
U.S. PATENT DOCUMENTS 3,963,326  6/1976  Buchert .......................... 340/815.31
4,271,408  6/1981  Teshima et al. .................. 340/815.1
4,306,716 12/1981  James et al. .................... 340/815.31
4,368,485  1/1983  Midland ............................. 340/701
4,384,279  5/1983  Fujita ............................. 340/815.2
4,578,672  3/1986  Oota et al. ......................... 340/702

FOREIGN PATENT DOCUMENTS 0114713  8/1984  European Pat. Off. ............ 340/716

Primary Examiner—Gerald L. Brigance
Assistant Examiner—Jeffery A. Brier
Attorney, Agent, or Firm—Oblon, Fisher, Spivak, McClelland & Maier

[57] ABSTRACT

A display device is disclosed which is capable of providing display image of high quality and resolution without flickering of picture cells and black lines on the image. The display device includes a reflector having a plurality of reflecting openings formed to respectively positionally correspond to the picture cells and be expanded in the forward direction.

7 Claims, 8 Drawing Figures

LARGE-SIZED COLOR DISPLAY DEVICE

BACKGROUND OF THE INVENTION

1. Field of the Invention

This invention relates to a display device suitable for use for an extra large-sized display system used in a theater, a stadium, an assembly room and the like, and more particularly to such a large-sized display device which is capable of providing image displayed with high quality.

2. Description of the Prior Art

Conventionally, a large-sized fluorescent display panel such as, for example, an extra large-sized color television uses a number of picture cells planely arranged, each of which comprises a picture cell display tube generally constructed in such a manner as shown in FIG. 1.

More particularly, the picture cell display tube includes a multicolor luminous cell 1 comprising, for example, an illuminant 2 of red luminous color, an illuminant 3 of green luminous color and an illuminant 4 of blue luminous color 4 and having positive voltage of several KV applied thereto. At the rear of the luminous cell 1 are arranged cathodes 5 opposite to the illuminants 2, 3 and 4, respectively. The display tube also includes first control electrodes 6 and second control electrodes 7 interposed between the cathodes 5 and the luminous cell 1. The first control electrodes have applied thereto a control signal of positive several V and the second control electrodes have positive voltage of ten-odd V applied thereto. Thus, the luminous cell 1, cathodes 5 and control electrodes 6 and 7 constitute the picture cell display tube, which serves as one picture cell for a large-sized display panel such as a supertelevision.

When a large number of such picture cell display tubes are arranged in a plane to constitute picture cells for, for example, a supertelevision, the assembling of the picture cell display tubes one by one is highly troublesome; accordingly, the formation of display units each of which comprises a plurality of the picture cell display tubes is often employed in the assembling of a supertelevision.

FIG. 2 shows one example of such a display unit, wherein a plurality of the luminous cells 1 which are to be incorporated in each of a plurality of picture cell display tubes are arranged on a display plate 9, and the cathodes 5 and first and second control electrodes 6 and 7 arranged opposite to the luminous cells 1 are disposed in the respective compartments 11 formed in a unit casing 10; so that the display unit may be constituted.

A number of the so-formed display units 12, as shown in FIG. 3, are arranged in two directions to constitute a large-sized display panel, for example, such as an extra large-sized color television.

However, in such a display unit 12 constructed as described above described, a non-luminous region is formed around the luminous cells 1 for various reasons. More particularly, the display plate 9 is required to have a peripheral portion 14 acting as an overlap width with respect to a side plate 13 of the unit casing 10 in the connection of the display plate 9 to the unit casing 10, so that the upper and lower portions 15 of each of the luminous cells 1 may not be used as an anode due to an edge cooling phenomenon occurring at the upper and lower ends of the cathodes 5. Likewise, both side portions 16 of each of the luminous cells 1 cannot be used as an anode because the electron diffusion from the second control electrodes 7 does not reach these portions.

For such reasons as described above, a non-luminous region is produced at the peripheral portion of each of the luminous cells 1 formed on the display plate 9 to decrease the ratio of the effective area of the luminous cells 1 to the total area of the display plate 9 or luminous density, so that the dispersion of the picture cells may occur to cause the appearance of flickering of the picture cells.

In order to increase the luminous density, it might be conceived to arrange the picture cells as high a density as possible within an allowable range at the central portion of the display plate 9, excluding the periphery thereof. However, this causes the picture cells to be unevenly distributed, resulting in the non-uniform arrangement of the picture cells with respect to the overall display. Particularly, when a display panel is formed of a plurality of the display units arranged in two directions, the areas interposed between the respective adjacent display units 12 to surround the display units form a non-luminous region extending in two directions to produce a striped or checkered pattern on the display panel in the display operation. Thus, the quality of display is highly deteriorated to impair substantially the visibility of displayed image.

Further, as shown in FIG. 2, lead wires 17 for each of the picture cell display tubes must be laterally led out between the side plate 13 and a top plate 18 in view of the assembling of the display unit 12. Such construction, as shown in FIG. 3, requires gaps 20 to be provided between the respective adjacent display units 12 to lead out the lead wires 17 therethrough in the arrangement of a plurality of the display units for the production of a supertelevision or the like. Unfortunately, the gaps 20 are observed as black lines during the luminous operation of the luminous cells 1 to significantly deteriorate the visibility of the displayed image.

SUMMARY OF THE INVENTION

The present invention has been made in view of the foregoing disadvantages of the prior art, such as a decrease in display density of picture cells, the occurrence of black lines on displayed image and the like due to the structural restriction of a color fluorescent display device while taking notice of the fact that the arrangement of a reflector having reflecting sides defining openings on a display plate effectively eliminates the above-described disadvantages and provides a satisfactory color fluorescent display device which provides high quality images of high resolution and does not generate flicker and black lines in the image.

Accordingly, it is an object of the present invention to provide a display device which is capable of effectively preventing a decrease in luminous density.

It is another object of the present invention to provide a display device which is capable of preventing flicker and occurrence of black lines on displayed image.

It is a further object of the present invention to provide a display device which is capable of providing a high quality image of high resolution.

In accordance with the present invention, there is provided a display device comprising a plurality of display units arranged adjacent each other, the display units each comprising a display plate; a plurality of luminous cells different in luminous color held on the display plate; a unit casing in which cathodes and control electrodes arranged opposite to the luminous cells are received; and a reflector mounted on the display plate, the reflector having a plurality of reflecting sides defining openings positioned opposite respective of the luminous cells, which openings gradually expand in a direction forward from the luminous cells.

In accordance with the present invention, there is also provided a display device comprising a plurality of display units each having a plurality of luminous picture cells arranged in rows; the picture cell rows in each display unit being arranged on a front cover of the display unit at intervals smaller than intervals between an end picture cell row in said display unit and an end picture cell row adjacent thereto in a display unit adjacent to said display unit; a reflector mounted on the front cover and having a plurality of reflecting sides defining openings which expand as a whole in the forward direction and which are arranged at constant intervals, the respectively openings being respectively positioned opposite respective of the picture cells.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein:

FIGS. 1 to 3 illustrate a conventional color fluorescent display device wherein FIG. 1 is a schematic perspective view showing the basic structure of a picture cell display tube used in the conventional color fluorescent display device, FIG. 2 is an exploded perspective view showing a conventional display unit, and FIG. 3 is a plan view of the conventional color fluorescent display device;

DETAILED DESCRIPTION OF THE PREFERRED EMBODIMENTS

Now, a display device according to the present invention will be described hereinafter with reference to FIGS. 4 to 8.

Figure 1:
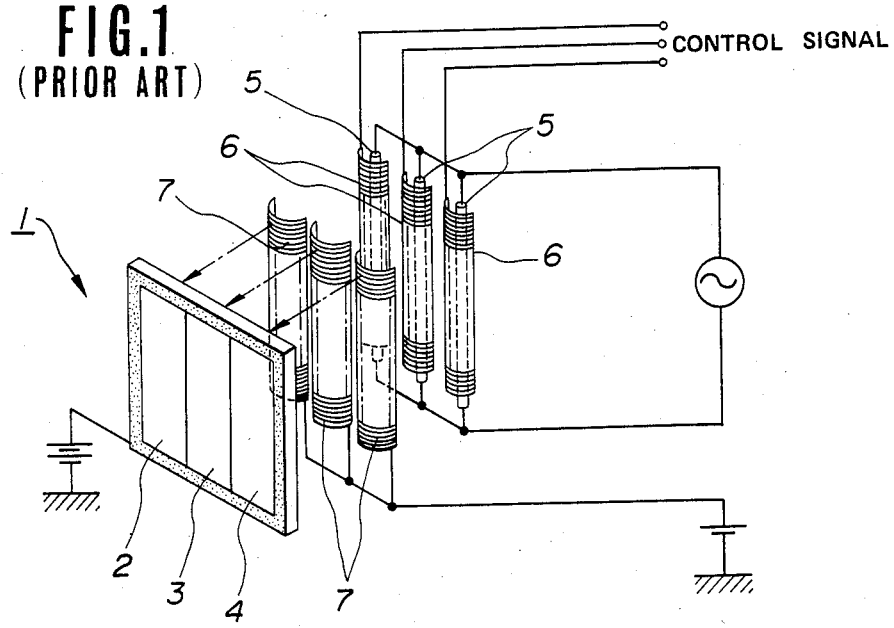
Figure 2:
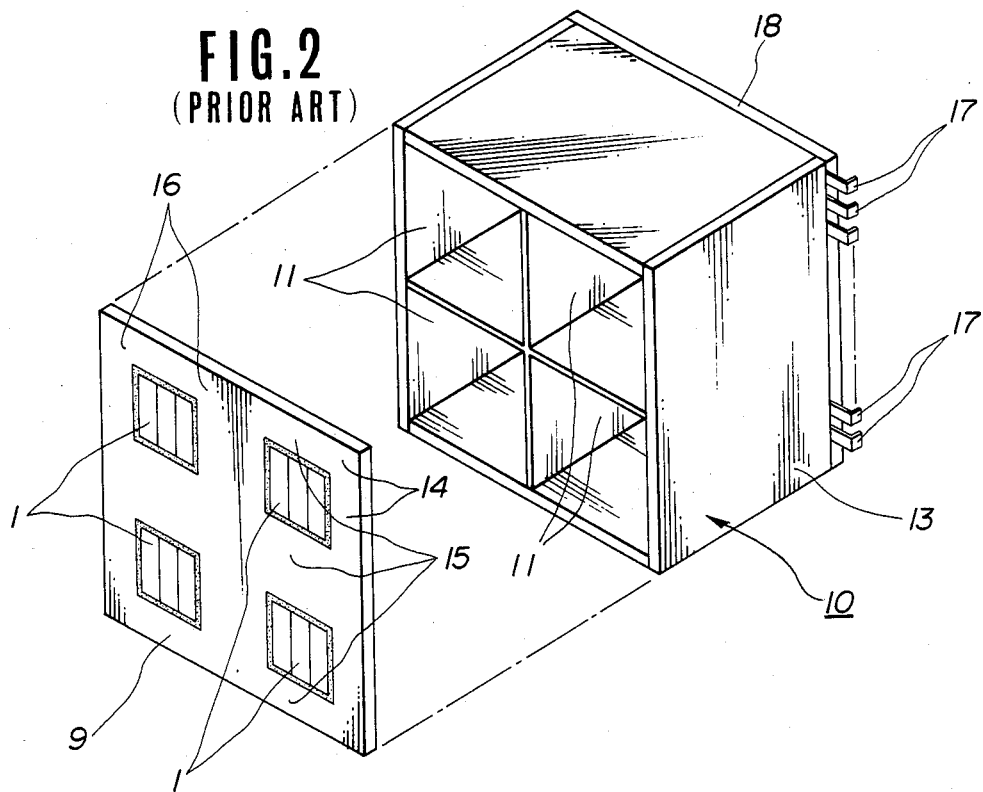
Figure 3:
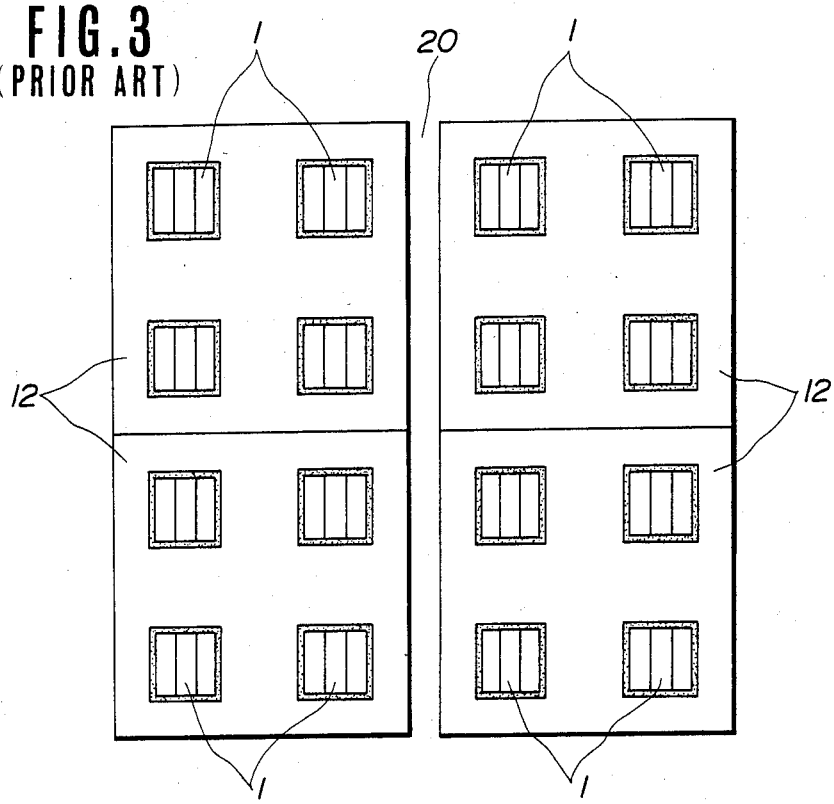
Figure 4:
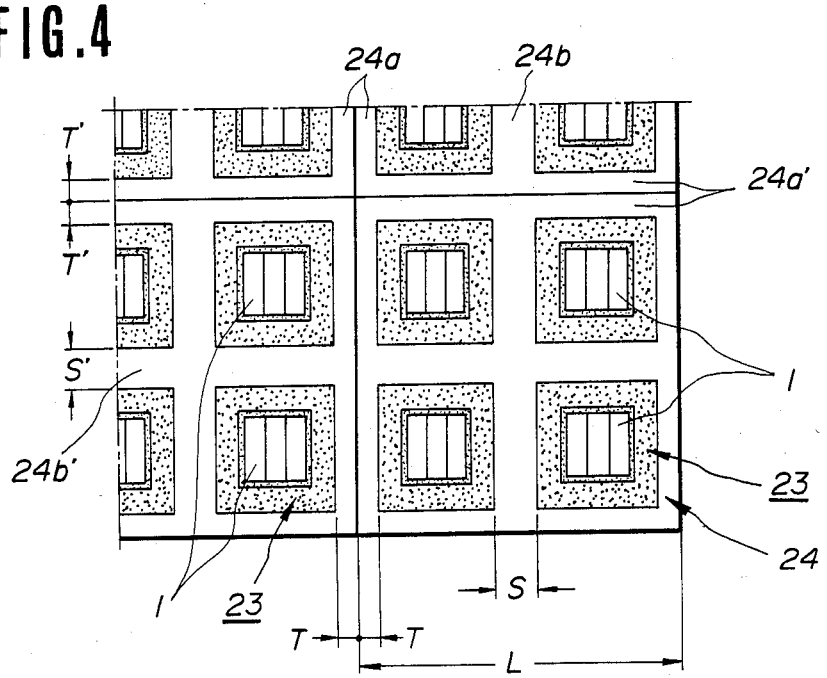
FIG. 4 is a plan view showing a first embodiment of a display device according to the present invention.
Figure 5:
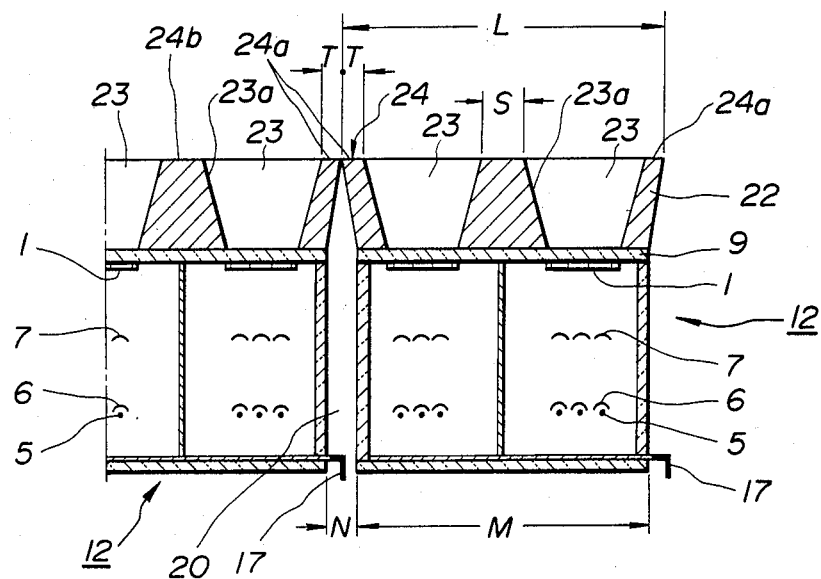
FIG. 5 is a vertical sectional view of the display device shown in FIG. 4.
Figure 6:
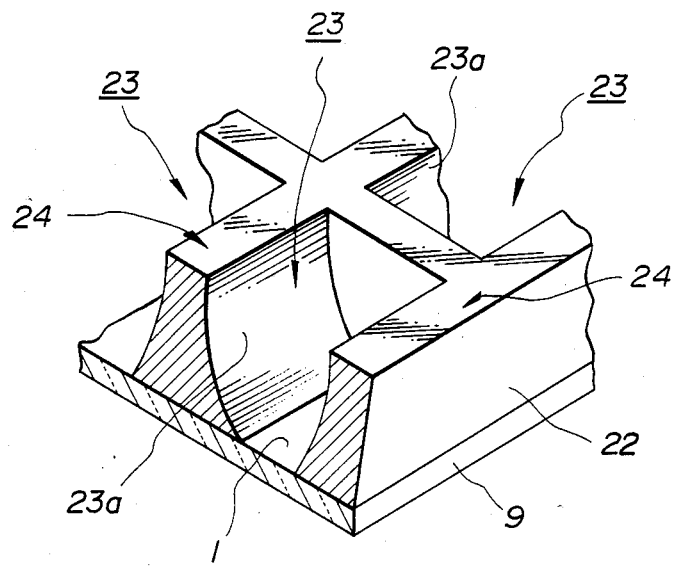
FIG. 6 is an enlarged perspective view partly in section showing a modification of the display device shown in FIG. 4.

FIGS. 4 to 6 illustrate a first embodiment of a display device according to the present invention wherein the present invention is embodied in the form of a color fluorescent display device. A color fluorescent display device of the illustrated embodiment, as shown in FIG. 5, includes a reflector 22 mounted on a display plate 9 of each of display units 12. The reflector 22 is provided with reflector openings 23 at the positions corresponding to luminous cells 1. The reflector openings 23 each are formed to be gradually expanded toward the front end thereof or in the forward direction. The reflector openings 23 each are defined by sides coated at the reflecting surface 23a thereof with reflecting material such as Al, Ag, MgO, white paint or the like. The reflecting surface 23a may be finished to be a specular surface. Alternatively, it may formed to be a diffusion surface having suitable fine roughness. When the reflecting surface 23a is specular, a diffusion plate formed of a semi-transparent material is conveniently mounted on the front end surface 24 of the reflector 22.

The front end surface 24 of the reflector 22 is formed to have dimensions larger than the width of the display unit 12 to allow a gap 20 to be defined between two display units 12 adjacent to each other which is sufficient to lead out lead wires 17 therethrough, whereas the longitudinal outer edges 24a of the front end surfaces 24 of the reflectors 22 adjacent to each other are abutted against each other not to form any gap therebetween. That is, the width L of the front end surface of the display unit equals the sum of the width M of the display unit 12 and the width N of the gap 20 between the display units 12.

Also, the dimensions of the front surface of the reflector is preferably determined to allow the assembling of a plurality of the display units 12 into a display panel or the like to be carried out in a manner to render the distances between the respective adjacent reflector openings 23 constant, to thereby uniformly distribute the reflector openings 23 on the display panel.

More particularly, the width S of the longitudinal central margin 24b of the front end surface 24 of the reflector 22 is about twice as large as the width T of the longitudinal outer edge or margin 24a thereof, and likewise the width S' of the lateral central margin 24b' of the front end surface 24 is about twice as large as the width T' of the lateral outer margin 24a'. Further, the width S of the longitudinal central margin 24b equals the width S' of the lateral central margin 24b'.

In the color fluorescent display device of the illustrated embodiment constructed as described above, when electrons are emitted from cathodes 5, first control electrodes 2 control the passage of the electrons and second control electrodes 7 carries out the diffusion of the electrons passing through the first control electrodes 6, so that the electrons selectively impinge on illuminants or phosphors 2, 3 and 4 arranged on each of luminous cells 1. Lights selectively emitted from the illuminants on which the electrons have impinged are mixed together to provide desired luminous color.

At that time, light emitted from each of the illuminants 2, 3 and 4 is directly forward radiated through the reflector openings 23 and a part thereof is diffusedly reflected by the reflecting surfaces 23a of the reflector openings 23 to be forward scattered.

The reflector opening 23 may be formed to have a gentle parabolic curved reflecting surface 23a as shown in FIG. 6.

In the illustrated embodiment, the luminous cells 1 arranged on the display plate 9 are four in number. However, the present invention is not limited to such arrangement.

Now, a second embodiment of a display device according to the present invention will be described with reference to FIGS. 7 and 8.

A display device of the illustrated embodiment includes a plurality of display units 101 each of which has picture cells 103 arranged in plural rows on a front plate or cover 102 with high density at intervals P2 smaller than the intervals P1 between an end picture cell row arranged at the end thereof and an end picture cell row arranged adjacent thereto in the adjacent display unit. The intervals P1 between the end picture cell rows of the adjacent display units cannot be decreased below a level for the structural and electrical reasons, however, the intervals P2 between the adjacent picture cell rows in each display unit 101 can be substantially decreased within an allowable range in the manufacture of the display device as compared with the intervals P1.

Figure 8:
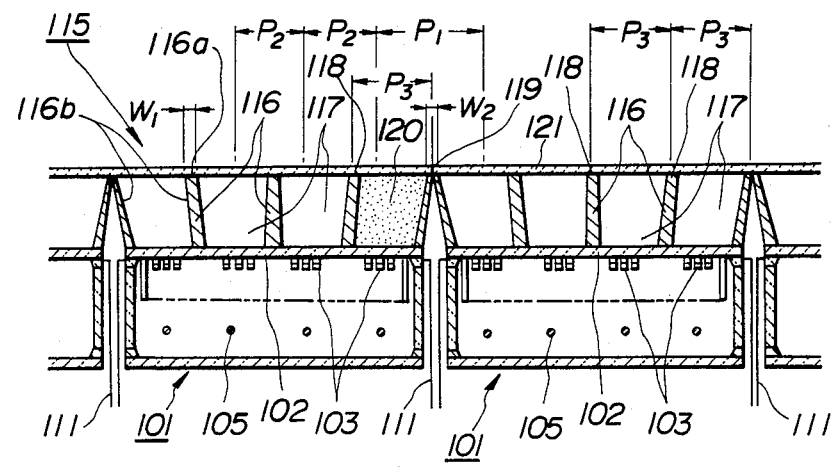
FIG. 8 is a vertical sectional view of the display device shown in FIG. 7.

The display units 101 each have a reflector 115 mounted on the front cover 102, which has a plurality of reflector openings 117 defined therein by reflecting plates 116 and is generally formed to be forward expanded or upward expanded in FIG. 8. The reflector 115 is arranged to be substantially abutted at the front end surface 118 against that of the adjacent display unit 101. Also, the reflector openings 117 are arranged so as to correspond to the respective picture cell rows 103 arranged on the front cover 102 and opened at constant intervals P3 at the front end surface 118. The intervals P3 are defined to be larger than the intervals P2 between the adjacent picture cell rows in each display unit 101 but smaller than the intervals P1 between the adjacent end picture cell rows in the adjacent display units. The front end surface 116a of each of the reflecting plates 116 other than those arranged at the periphery of the reflector 115 is preferably formed to have a constant width W1. Also, the width W1 is preferably determined to equal the sum W2 of the width of the front end surface 119 of the end reflecting plate 116 arranged at the periphery of the reflector 115 and the width of the front end surface 119 of the adjacent end reflecting plate 116 of the adjacent reflector 115. When a gap is formed between the adjacent display units for the sake of convenience in the assembling and manufacturing of the display device, the width W2 contains such a gap. The reflecting plates 116 defining the reflector openings 117 therebetween may be finished with a light reflective material. Also, the reflector openings 117 may be filled with light transmitting and light diffusing resin 120 to provide a solid reflector.

Figure 7:
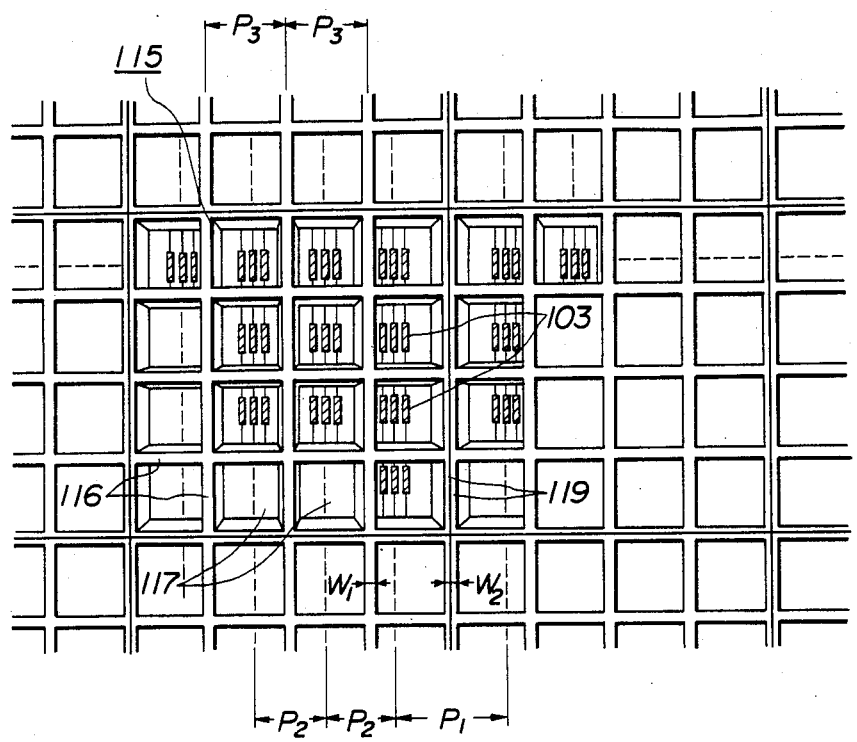
FIG. 7 is a plan view showing a second embodiment of a display device according to the present invention.

As shown in FIGS. 7 and 8, the reflecting plates 117 define different angles with respect to the front cover 102, such that reflected light emerges from the respective openings at different angles, depending upon the position of each opening 117 with regard to the other openings 117 of the reflector 115. Further, the reflector 115 may be provided on the front surface thereof with a diffusion filter 121 to further diffuse light emitted from the picture cells 103 to more effectively carry out the plane uniformity of the picture cells.

In the illustrated embodiment, lights different in luminous color emitted from the respective picture cell rows 103 are reflected by the reflecting plates 116 through the openings 117 during the forward passage, so that the lights may be radiated uniformly from the front surfaces of the reflector 115. At that time, the light is forward directed while being reflected by the surfaces 116b of the reflecting plates 116 finished to reflect light and then diffused by the diffusion filter 121 mounted on the front surface of the reflector 115, so that the lights of green, blue and red luminous colors may be effectively mixed together.

The diffusion filter 121 may be formed of a light transmitting material of dark color to improve the contrast of display. Alternatively, it may be colored to improve the color balance of display. The embodiments illustrated have been described with respect to a color fluorescent display device, however, the present invention is not limited to such a display device so far as a plurality of illuminants acting as picture cells are arranged on a display panel. Thus, it will be noted that the present invention is not limited to any specific illuminant and contains various kinds of display devices including a display device using a light emitting diode, a plasma display device, a monochromatic display device and the like.

While preferred embodiment of the invention have been described with a certain degree of particularity, obvious modifications and variations are possible in light of the above teachings. It is therefore to be understood that within the scope of the appended claims, the invention may be practiced otherwise than as specifically described.

What is claimed is:

1. A display device comprising:
    a plurality of display units positioned adjacent each other, said display units each comprising,
    a display plate,
    a plurality of luminous cells held on said display plate, said luminous cells each including illuminants different in luminous color,
    a unit casing in which cathodes and control electrodes arranged opposite to said luminous cells are disposed, and
    a reflector mounted on said display plate, said reflector having a plurality of reflecting sides defining openings, each opening being positioned to correspond to a respective of said luminous cells and gradually expanding in a direction forward from said luminous cells;
    wherein said reflector has a front surface opposite said casing, said front surfaces having a width which is wider than the respective unit casing;
    said unit casings of adjacent display units separated by a gap which has a width sufficiently wide to enable lead wires to said electrode to pass through said gaps;
    the reflectors of adjacent display units having contiguous front surfaces; and
    the width of the front surface of each said reflector equaling the sum of the width of the unit casing and the width of said gaps;
    wherein the front end surface of said reflecting opening has a longitudinal central margin defining a width (S), a longitudinal outer margin defining a width (T), a lateral central margin defining a width (S'), and a lateral outer margin defining a width (T'), which have the following dimensional relationship:

$$S \approx 2T \approx S' \approx 2T'.$$

2. A display device comprising:
    a plurality of display units arranged adjacent each other and each having a plurality of luminous picture cells arranged in rows in two directions;
    said picture cell rows in each display unit being arranged on a front cover of the display unit at intervals smaller than intervals between an end picture cell row in said display unit and an end picture cell row adjacent thereto in the adjacent display unit;
    plural reflectors respectively mounted on the front cover of a respective display unit, and each reflector having a plurality of reflecting sides defining openings which expand in a forward direction and which are arranged at constant intervals, said openings each being positioned opposite a respective picture cell;

wherein said reflector has a front end surface where the sides defining said openings define peripheral portions and plural central portions of each said reflector, said peripheral and central portions having respective widths selected such that the sum of the widths of the peripheral portions of reflectors of adjacent display units equal the widths of the central portions of each said reflector, said display unit being separated by a predetermined gap with the reflectors of adjacent display units being contiguous.

3. A display device as defined in claim 2, wherein each said picture cell comprises a plurality of illuminants different in luminous color.

4. A display device as defined in claims 2 or 3, wherein said reflecting sides defining said opening each have an inner surface finished to carry out light reflection.

5. A display device as defined in claims 2 or 3, wherein a space between said reflecting sides defining each of said openings is filled with light transmitting resin.

6. A display device as defined in claims 2 or 3, further comprising a diffusion filter provided on the front surface of each said reflector.

7. A display device as defined in claims 2 or 3, wherein at least some of said reflecting sides defining said openings are arranged at predetermined different angles with respect to said display cells such that illumination reflected by said sides through said openings emerges from the openings defined by said at least some reflecting sides at different angles.

* * * * *